US005159154A

United States Patent [19]

Hillis

[11] Patent Number: 5,159,154

[45] Date of Patent: Oct. 27, 1992

[54] MULTIPLE CONDUCTOR DIELECTRIC CABLE ASSEMBLY AND METHOD OF MANUFACTURE

[75] Inventor: W. Daniel Hillis, Brookline, Mass.

[73] Assignee: Thinking Machines Corporation, Cambridge, Mass.

[21] Appl. No.: 570,228

[22] Filed: Aug. 21, 1990

[51] Int. Cl.[5] ...................... H01B 17/36; H02G 15/20

[52] U.S. Cl. .................................. 174/9 R; 174/99 R

[58] Field of Search ................. 174/9 R, 96, 98, 99 R, 174/22 R

[56] References Cited

U.S. PATENT DOCUMENTS

| | | | |
|---|---|---|---|
| 217,479 | 7/1879 | Pierson | 174/96 |
| 231,825 | 8/1880 | Manly . | |
| 284,413 | 9/1883 | Green et al. | 174/99 R |
| 342,324 | 5/1886 | Brandon | 174/156 |
| 2,235,896 | 3/1941 | Matthews | 174/46 |
| 2,963,539 | 12/1960 | Hynes | 174/138 |
| 3,013,108 | 12/1961 | Sweeney | 174/99 R |
| 3,731,139 | 5/1973 | Herickhoff et al. | 174/17.05 X |
| 3,943,470 | 3/1976 | Bingham | 333/97 |
| 4,230,898 | 10/1980 | Emmel | 174/32 |
| 4,262,265 | 4/1981 | Nygren et al. | 333/33 |
| 4,321,425 | 3/1982 | Emmel | 174/32 |
| 4,383,226 | 5/1983 | Nygren et al. | 333/33 |
| 4,437,074 | 3/1984 | Cohen et al. | 333/128 |
| 4,584,429 | 4/1986 | Raketti et al. | 174/18 |
| 4,614,922 | 9/1986 | Bauman et al. | 333/161 |
| 4,626,298 | 12/1986 | Allard | 156/55 |
| 4,681,655 | 7/1987 | Potter | 156/632 |
| 4,847,443 | 7/1989 | Basconi | 174/32 |

*Primary Examiner*—Leo P. Picard
*Assistant Examiner*—Hyung S. Sough
*Attorney, Agent, or Firm*—Weingarten, Schurgin, Gagnebin & Hayes

[57] ABSTRACT

A multiple conductor dielectric cable assembly and method of manufacture is disclosed. The cable assembly comprises an elongated housing in which grooved damper elements are mounted in a stacked relationship at intervals along the housing. Electrical conductors pass over and under the grooves of the damper elements along a path between connections in the walls of the housing. The grooves of adjacent damper elements are oppositely oriented and offset to provide deviations of the conductors from a straight line, thereby holding the conductors under tension and spaced from other conductors and the walls of the housing. Any desired dielectric medium, such as air or a vacuum, fills the interior of the housing to surround each conductor. In the manufacture of the cable assembly, a first set of damper elements, with the grooves facing upwardly, is dropped into supports in the housing. The conductor elements are laid into the upwardly-facing grooves of the first set of damper elements. A second set of damper elements, with the grooves facing downwardly, is dropped into supports between the dampers with the upwardly-facing grooves to maintain the conductors under tension. The process may be repeated for as many levels of conductors as desired.

31 Claims, 5 Drawing Sheets

MULTIPLE CONDUCTOR DIELECTRIC CABLE ASSEMBLY AND METHOD OF MANUFACTURE

FIELD OF THE INVENTION

The present invention relates to electrical cables and more particularly to multiple conductor cables in which a desired dielectric medium may be provided around the conductors.

BACKGROUND OF THE INVENTION

Cables of electrical conductors in data transmission or computer applications are typically formed of many wires running between the same terminations and are insulated from each other by embedding each conductor in a dielectric medium having an average dielectric constant. In cables having multiple conductors, the conductors are typically individually embedded in a solid dielectric material which also separates the conductors from each other to prevent short circuits. The individual cables may also be shielded and further surrounded by a common insulating sheath. Such cables are complex to construct and thus expensive. Moreover, faults such as open or short circuits may be invisible until start-up of the associated circuitry reveals them.

SUMMARY OF THE INVENTION

The present invention provides a multiple conductor cable which is readily manufacturable. The present invention comprises an elongated housing which is substantially rigid and comprises an elongated channel, enclosed at each end, and a lid. The electrical conductors or wires run along the length of the channel. U-shaped support members are placed at intervals within the channel. Grooved damper elements are mounted in a stacked relationship in each U-shaped support member. The electrical conductors pass over and under the damper elements along a path between connections in the walls of the housing. The grooves of adjacent damper elements are oppositely oriented and offset to provide deviations of the conductors from a straight line path. In this manner, the damper elements hold the conductors under tension and spaced from other conductors and the walls of the housing and dampen vibrations in the conductors. A dielectric medium fills the interior of the housing to surround each conductor. The wires inside the housing may be connected to a printed circuit board, another cable, or any other desired connection outside the housing via suitable connections in the housing walls.

In the manufacture of the cable assembly, the U-shaped support members are fastened to the channel. A first set of damper elements, with the grooves facing upwardly, is dropped into slots in alternate U-shaped support members. The conductors or wires, which are provided on reels, are unrolled and fastened to a header mounted on one end of a jig. The wires are cut to the appropriate length and fastened to a further header mounted on the opposite end of the jig. The wires are then laid into the upwardly-facing grooves of the first set of damper elements. A second set of damper elements, with the grooves facing downwardly, is dropped into the remaining U-shaped supports, locking the conductors between the first and second sets of damper elements and holding the conductors under tension. The process may be repeated for as many levels of conductors as desired.

The conductors are then attached to the walls of the housing, generally at the ends, with any suitable connection. The interior chamber of the housing is filled, such as by injection, with a dielectric. The dielectric may be any suitable dielectric fluid, such as air, oil, or $N_2$, or a suitable dielectric solid. The lid is placed on the channel to close the chamber. If a vacuum is to be the dielectric, the housing is evacuated and sealed.

DESCRIPTION OF THE DRAWINGS

The invention will be more fully understood from the following detailed description taken in conjunction with the accompanying drawings in which.

DETAILED DESCRIPTION OF THE INVENTION

Figure 1:
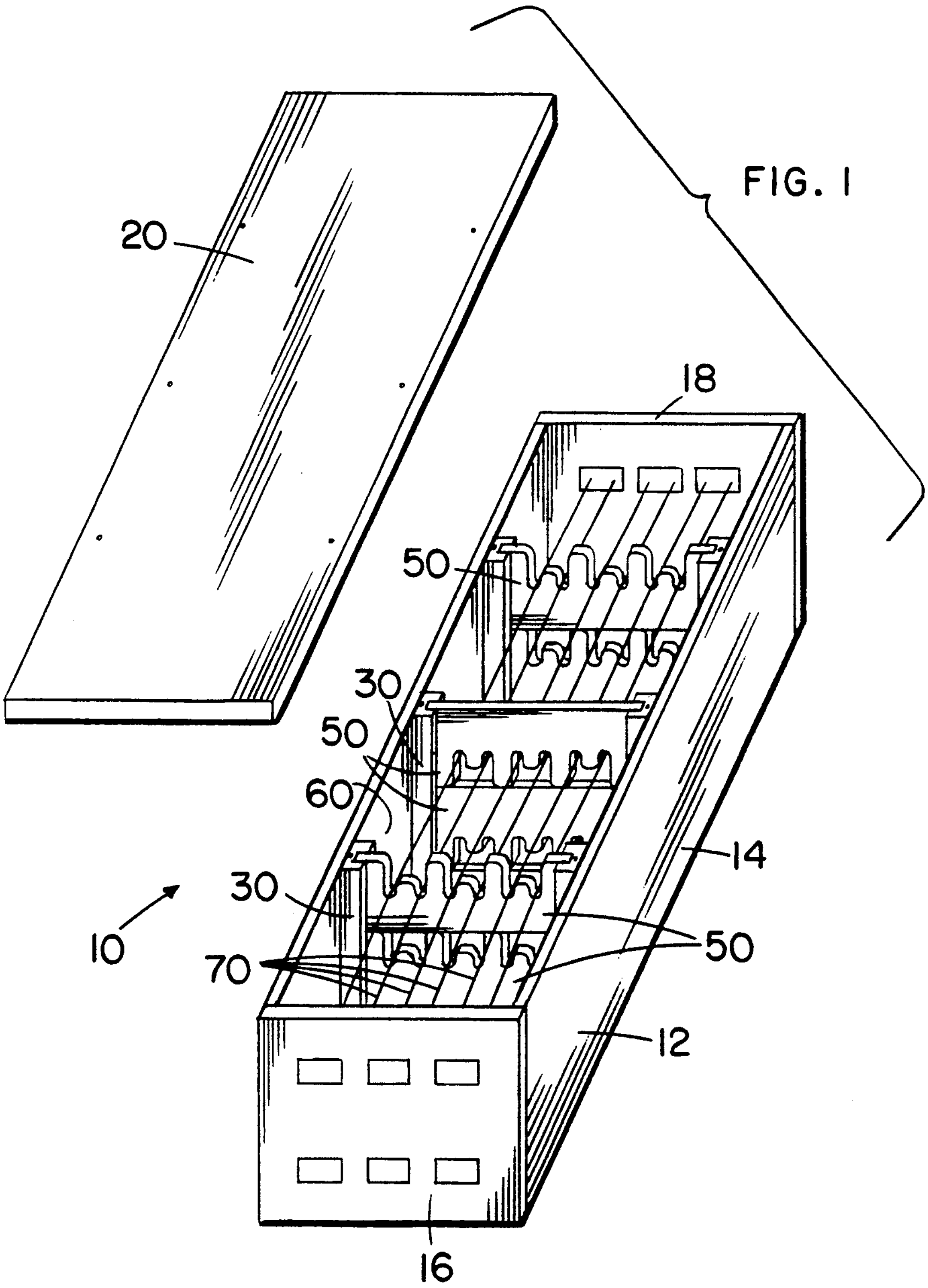
FIG. 1 is an exploded perspective view of the preferred embodiment of the present invention.
Figure 2:
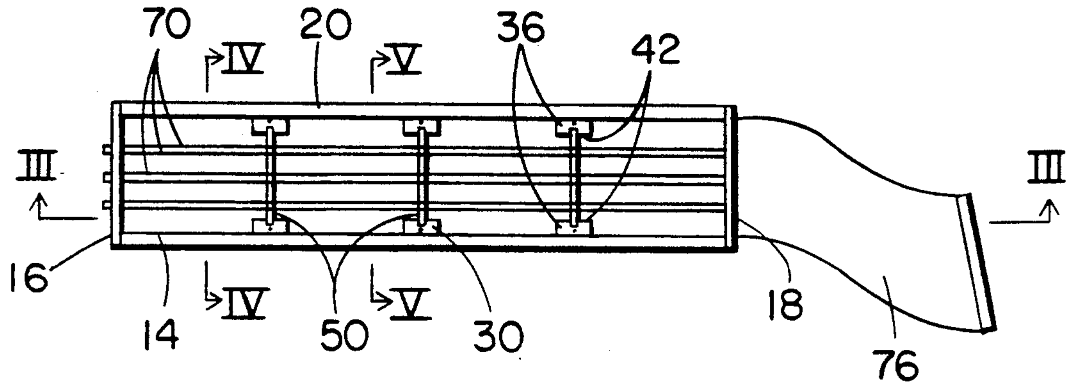
FIG. 2 is a top plan view of the invention of FIG. 1.

The preferred embodiment of the cable assembly of the present invention is shown generally at 10 in FIG. 1. The cable assembly 10 comprises a housing 12 having an elongated channel 14. End pieces 16, 18 are provided on each end of the channel 14. A lid 20 is provided to close the top of the channel.

U-shaped support members 30 are mounted at intervals within the channel 14 and fastened to the housing with bolts 32 inserted through holes in the lid 20, support members 30, and the floor of the channel 14. Alternatively, any other suitable manner of fastening the support members to the housing may be used. Each U-shaped support member 30 has two upstanding arms 36. Opposed slots 40 are provided in the interiorly-facing surfaces 42 of the arms 36.

Figure 6:
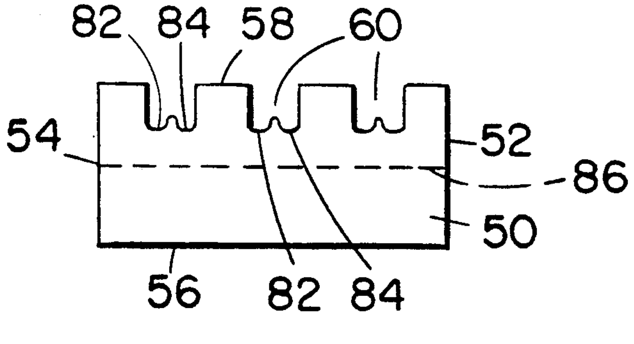
FIG. 6 is a view of a damper element of the present invention.

Damper elements 50 are stackably mounted within each U-shaped support member 30. As best seen in FIG. 6, each damper element 50 is generally planar and rectangular, having three edges 52, 54, 56 that are substantially straight. A fourth edge 58 has grooves or recesses 60 formed therein. Each damper element 50 fits slidably within a pair of opposed slots 40 by inserting the edges 52 and 54 within the slots 40.

Each damper element 50 may fit within a U-shaped support member 30 either with the grooves 60 oriented to open upwardly or to open downwardly. As best seen in FIG. 1, the damper elements are inserted into the U-shaped support members such that all damper elements within one U-shaped support member are oriented in the same direction, i.e., with the grooves all facing upwardly or all facing downwardly. In addition, the damper elements in alternating U-shaped support members are oriented in the same direction. Therefore, damper elements in adjacent U-shaped support members are oriented in the opposite direction.

Electrical conductors or wires 70 are carried within the channel 14 of the housing 12. The wires 70 may be connected to the end pieces 16, 18 of the housing 12 in any suitable manner to provide a good mechanical and electrical connection. For example, they may be soldered, crimped, or welded to suitable connections in the end pieces. The end pieces may provide connections directly to a printed circuit board (not shown) or to ribbon cables 76. Alternatively, the wires may extend through openings in the end pieces to a wire wrap or other termination.

Figure 3:
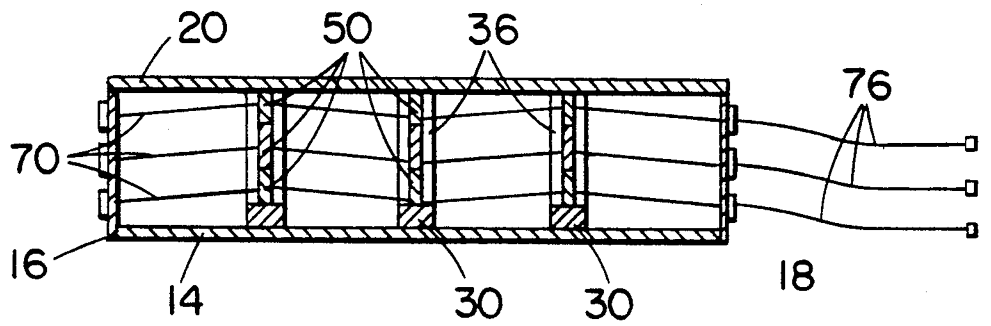
FIG. 3 is a cross-sectional elevational view along line III—III of FIG. 2.
Figure 4:
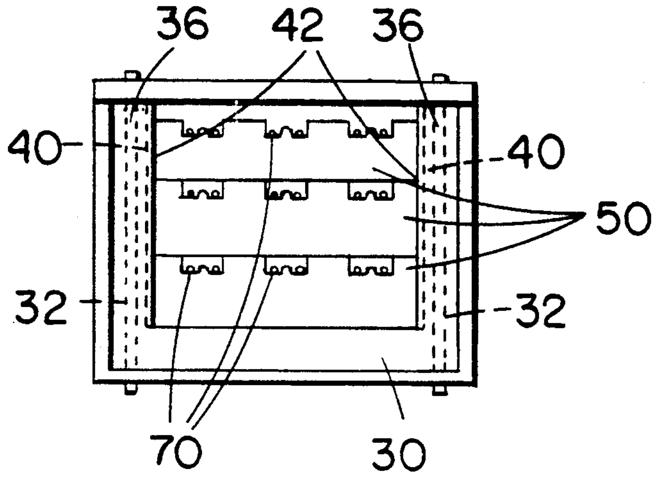
FIG. 4 is a cross-sectional view along line IV—IV of FIG. 2.
Figure 5:
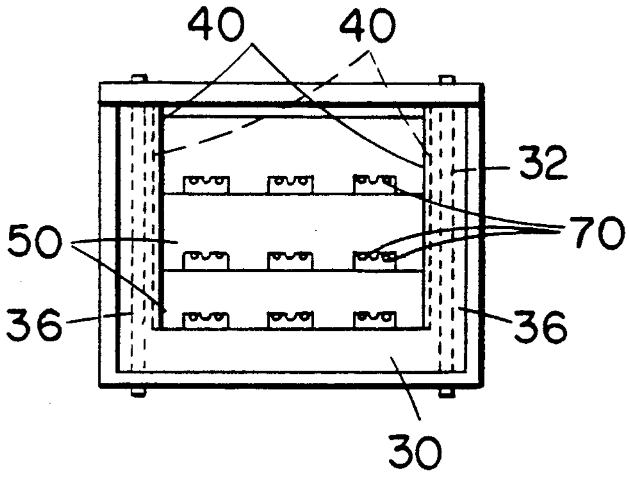
FIG. 5 is a cross-sectional view along line V—V of FIG. 2.

Referring to FIGS. 1 and 3, the wires 70 pass over and under the grooves 60 of the damper elements 50. The damper elements are stacked or placed in levels in the U-shaped support members. Each level of damper elements supports a separate level of conductors. Any desired number of levels of damper elements and conductors may be provided.

The grooves 60 of the damper elements 50 generally are formed to have a pair of rounded wells 82, 84 so that the wires 70 may conveniently be provided in pairs for differential signal transmission if desired. Differential signal transmission aids in reducing common-mode interference, if the wires are close enough so that substantially the same interference signal is induced in the two wires by the common-mode interference source. The spacing and depth of the wells 82, 84 and of the grooves 60 may be varied to achieve a desired impedance. The damper elements are formed from a non-conductive material with a high damping constant, such as TEFLON. The damping elements thereby do not support vibrations themselves and aid in suppressing or damping vibrations of the conductors.

The grooves 60 extend to a depth which is less than half the distance across the width of the damper element 50, as indicated by the dotted line 86 in FIG. 6. Accordingly, when the damper elements 50 are slipped within the U-shaped support members 30, the bottom of the upwardly-facing grooves do not fall at the same vertical level as the top of the downwardly-facing grooves of damper elements in the same level in the adjacent U-shaped support members. When a wire is placed over upwardly-facing grooves and beneath downwardly-facing grooves, it deviates slightly from a straight line path, as best shown in FIG. 3. In this manner, the damper elements 50 maintain tension on the wires.

The housing 12 forms a chamber for containing a dielectric medium. Any fluid or solid medium having an appropriate dielectric constant for a particular application may be used. For example, for high speed data transmission applications, air is a desirable dielectric. Other dielectrics include oil or $N_2$. Suitable sealing of the housing may be provided if necessary. The housing may also be evacuated and sealed to provide a vacuum as a dielectric if desired.

Figure 7:
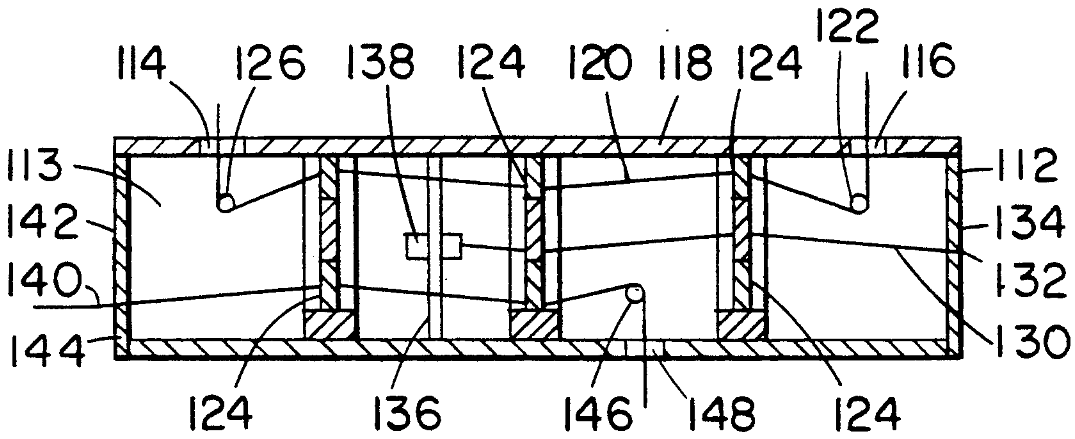
FIG. 7 is cross-sectional side view of an alternative embodiment of the present invention.

Alternative embodiments in which the electrical conductors take different paths through the housing and access is provided to the conductors at intermediate locations in the housing are contemplated by the invention. For example, as shown in FIG. 7, the housing 112 may have openings 114, 116 in the lid 118. An electrical conductor 120 may enter housing 112 through the opening 114 and pass around a pin 122, through damper elements 124, around a second pin 126, and out through opening 116. Pins 122 and 126 may be fastened in any suitable manner to the side walls of the channel 113 of the housing 112. Alternatively, an electrical conductor 130 may enter the housing 112 through an opening 132 in end piece 134 and pass through the damper elements 124, around pin 136 fastened to the floor of the channel 113, and out through opening 138 in the side wall of the channel. Similarly, an electrical conductor 140 may enter the housing 112 through an opening 142 in end piece 144 and pass through one or more damper elements 124, around pin 146 fastened to the side walls of the channel 113, and out through opening 148 in the floor of the channel 113.

Figure 8:
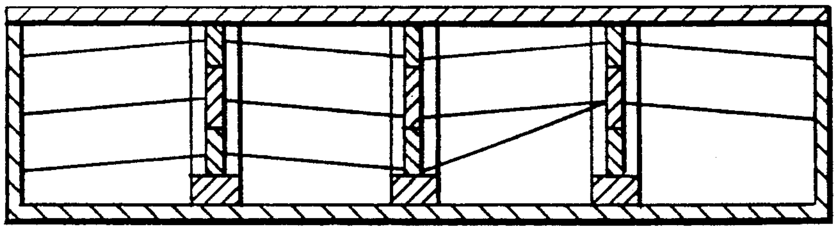
FIG. 8 is a cross-sectional side view of a further embodiment of the present invention.

It will be apparent that the electrical conductors may take any desired path through the housing simply by placement of pins as necessary and the provision of openings in the ends, sides, floor, or lid of the housing. Alternatively, connections, rather than openings, may be provided in the ends, sides, floor, or lid of the housing to which the electrical conductors may be appropriately connected. In a further alternative, conductors may be interleaved such that a conductor may pass from one level to another level as shown in FIG. 8. Also, while multiple conductors have been shown, a single conductor also may be provided.

Figure 9:
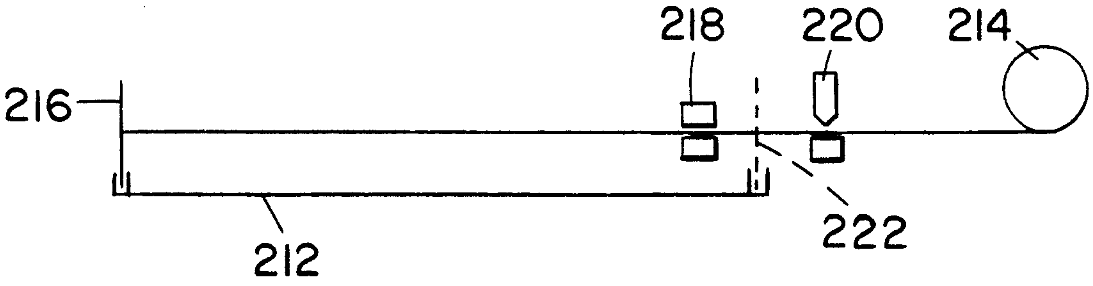
FIG. 9 is a diagram illustrative of the manufacture of the present invention.

Referring to FIG. 9, the cable assembly of the present invention is manufactured with the use of a jig 212. A header 216 is placed at one end of the jig 212. The electrical conductors are generally supplied on reels 214. The free end of the conductors are attached to the header 216. Grippers 218 at the opposite end of the jig 212 grip the conductors and pull them to a desired tautness. The conductors are cut by a cutter 220 to a suitable length, to which the jig may be set. Next, the conductors are attached to a further header 222 placed at the opposite end of the jig 212. The headers may include connector pins to be wire wrapped or any other termination.

The U-shaped support members are placed into the channel and fastened. A first set of damper elements, having the grooves oriented to face upwardly, are slipped into the slots of alternate U-shaped support members. The conductors, attached to the headers, are dropped into the grooves of the dampers. A second set of damper elements, having the grooves oriented to face downwardly, are slipped into the slots of the remaining U-shaped support members and over the conductors.

This process is repeated for as many levels of conductors as desired. When the last level of conductors is in place, the lid of the housing is placed on top of the channel and fastened in any suitable manner. The conductors are tensioned and fastened in any suitable manner to the housing, as discussed above. If desired, the headers may comprise the end pieces of the housing with connections to printed circuit boards, cables, or other devices.

The channel of the housing may be of any desired dimensions. Similarly, there may be any desired number of U-shaped support members within the housing and any desired number of levels of damper elements and conductors. Alternatively, in lieu of separately installable U-shaped support members, the inner surfaces of the housing may have grooves or slots into which the damper elements fit directly rather than fitting the damper elements into the U-shaped support members. The housing is preferably formed of a material having a thermal expansion within the elastic range of the wire. Aluminum and copper are generally suitable materials. The damper elements may be formed of any polymer. TEFLON is generally suitable.

The cable assembly of the present invention is suitable for the transmission of signals at high propagation rates with low levels of cross talk between transmission lines for a wide range of impedances. The assembly has a low material cost. It may be readily mass produced and integrates the manufacture of the cable housing with the cable conductors.

The invention is not to be limited by what has been particularly shown and described, except as indicated in the appended claims.

I claim:

1. An electrical conductor cable assembly comprising:

a substantially rigid housing;

a dielectric medium within the housing;

electrical conductors within the housing; and planar elements separately installable at intervals in the housing for spacing and for maintaining the conductors in tension within the housing to hold the conductors within the dielectric medium in spaced relation from each other and from internal surfaces of the housing, the planar elements having one edge in which a plurality of conductor receiving grooves are formed, the grooves of the planar elements installed at adjacent intervals being oppositely oriented to cause the conductors to deviate from a straight line path through the housing.

2. The electrical conductor cable assembly of claim 1, wherein the dielectric medium is air.

3. The electrical conductor cable assembly of claim 1, wherein the dielectric medium is oil.

4. The electrical conductor cable assembly of claim 1, wherein the dielectric medium is $N_2$.

5. The electrical conductor cable assembly of claim 1, wherein the dielectric medium is a vacuum.

6. The electrical conductor cable assembly of claim 1, wherein the maintaining means further includes means for damping vibrations of the conductors.

7. The electrical conductor cable assembly of claim 6, wherein the damping means is made of a material having a high damping coefficient.

8. The electrical conductor cable assembly of claim 1, wherein the maintaining means further includes means for supporting the conductors at spaced intervals within the housing.

9. The electrical conductor cable assembly of claim 8, wherein the supporting means further includes means for supporting the conductors at different levels within the housing.

10. The electrical conductor cable assembly of claim 1, further including a plurality of conductor connections in walls of the housing for connecting the conductors within the housing to a device outside the housing.

11. An electrical conductor cable assembly comprising:

a substantially rigid housing;

a dielectric medium within the housing;

electrical conductors within the housing;

a plurality of U-shaped support members disposed at intervals within the housing, each support member having opposed, interiorly-facing surfaces having a slot therein;

a plurality of plate members stackably received within the slots of each support member, each plate member having a planar configuration comprising three sides each having substantially straight edges and a fourth side having a plurality of conductor receiving grooves therein, all of the plate members received within one support member being oriented in the same manner, the plate members received within adjacent support members being oppositely oriented; and wherein the electrical conductors each pass through one of the grooves of one of the plate members of at least some of the support members, wherein the opposite orientations of the plate members in adjacent support members force the conductors to deviate from a straight line path through the housing.

12. An electrical conductor cable assembly comprising:

a substantially rigid housing having a plurality of slots formed at intervals along internal surfaces of the housing;

a plurality of plate members stackably received within each slot, each plate member having a planar configuration comprising three sides each having substantially straight edges and a fourth side having a plurality of conductor receiving grooves therein, all of the plate members received within one slot being oriented in the same manner, the plate members received within adjacent slots being oppositely oriented;

a dielectric medium within the housing; and electrical conductors within the housing, the electrical conductors each passing through one of the grooves of one of the plate members of at least some of the slots, wherein the opposite orientations of the plate members in adjacent slots force the conductors to deviate from a straight line path through the housing.

13. An electrical conductor cable assembly comprising:

a substantially rigid housing;

a dielectric medium within the housing;

electrical conductors within the housing; and means separately installable within the housing for supporting the conductors in spaced relation within the housing and for damping vibrations in the conductors, said supporting and damping means comprising planar elements stackably installable at intervals along the housing, the planar elements having a conductor-receiving groove formed in one edge thereof, the planar elements being oriented oppositely to the planar elements at adjacent intervals such that the conductor-receiving grooves are oppositely directed.

14. The electrical conductor cable assembly of claim 13, wherein the supporting and damping means further includes means for maintaining the conductors under tension.

15. The electrical conductor cable assembly of claim 13, wherein the dielectric medium is a fluid.

16. The electrical conductor cable assembly of claim 13, wherein the dielectric medium is air.

17. The electrical conductor cable assembly of claim 13, wherein the dielectric medium is oil.

18. The electrical conductor cable assembly of claim 13, wherein the dielectric medium is $N_2$.

19. The electrical conductor cable assembly of claim 13, wherein the dielectric medium is a vacuum.

20. An electrical conductor cable assembly comprising:

a substantially rigid housing;

electrical conductors within the housing;

a dielectric medium within the housing; and a plurality of plate members separately installable within the housing for damping vibrations in the conductors, said plurality of plate members being stackably disposed at intervals along the housing, each plate member having a planar configuration having at least one edge having a groove therein, the grooved edge of stacked plate members within a stack of plate members being oriented in the same direction, the grooved edge of plate members in adjacent stacks being oppositely oriented.

21. An electrical conductor cable assembly comprising:

a substantially rigid housing evacuated and sealed to contain a vacuum;

electrical conductors within the housing; and means separately installable within the housing for spacing and for maintaining the conductors in tension within the housing to hold the conductors within the vacuum in spaced relation from each other and from internal surfaces of the housing, the maintaining means comprising planar elements having a grooved edge therein, the planar elements being oriented in the housing such that the grooved edge of adjacent elements are oppositely directed.

22. A multiple conductor cable assembly, comprising:

a housing comprising an elongated channel, an end piece on each end of the channel, and a removable lid on the channel;

a dielectric medium within the housing;

a plurality of U-shaped support members disposed at intervals within the channel, each support member having opposed, interiorly-facing surfaces having a slot therein;

a plurality of planar elements stackably received within the slots of each support member, each planar element having a planar configuration comprising three sides each having substantially straight edges and a fourth side having a plurality of conductor receiving grooves therein, all of the planar elements received within one support member being oriented in the same manner, the planar elements received within adjacent support members being oppositely oriented;

a plurality of uninsulated electrical conductors disposed within the housing, each conductor passing through one of the grooves of one of the planar elements of at least some of the support members, wherein the opposite orientations of the planar elements in adjacent support members force the conductor to deviate from a straight line path; and a plurality of conductor connections on each end piece of the housing.

23. The multiple conductor cable assembly of claim 22, wherein the dielectric medium is a fluid.

24. The multiple conductor cable assembly of claim 23, wherein the fluid is air.

25. The multiple conductor cable assembly of claim 22, wherein the planar elements have a high damping coefficient to dampen vibrations in the conductors.

26. A method of making a multiple conductor cable comprising:

arranging a plurality of spaced conductors between headers in an elongated channel of a cable housing;

inserting a first set of planar support members at intervals in the channel member, the planar support members having upwardly-facing, conductor receiving grooves therein;

setting the electrical conductors in the conductor receiving grooves of the first set of planar support members, each groove receiving no more than one electrical conductor; and inserting a second set of planar support members in the channel member between the first set of planar support members, the second set of planar support members having downwardly-facing, conductor receiving grooves therein, the electrical conductors received within the downwardly-facing grooves.

27. The method of claim 26, wherein the planar support members maintain the conductor elements under tension.

28. The method of claim 26, wherein the planar support members force the electrical conductors to deviate from a straight line path through the housing.

29. The method of claim 28, further including providing additional levels of planar support members and electrical conductors.

30. The method of claim 26 wherein the step of arranging the plurality of conductors includes:

placing a first header in a jig;

attaching ends of the plurality of electrical conductors to the first header;

cutting the electrical conductors to a predetermined length;

placing a second header in the jig at an opposite end of the jig;

attaching the cut ends of the electrical conductors to the second header.

31. An electrical conductor cable assembly comprising:

a substantially rigid housing;

at least one electrical conductor within the housing;

a dielectric medium within the housing; and means separately installable within the housing for maintaining the conductor in tension within the housing to hold the conductor within the dielectric medium in spaced relation from internal surfaces of the housing, the maintaining means comprising planar elements having a grooved edge therein, the planar elements being oriented in the housing such that the grooved edge of adjacent elements are oppositely directed.

* * * * *